United States Patent

Gretz

[11] Patent Number: 6,133,529
[45] Date of Patent: Oct. 17, 2000

[54] LINER ASSEMBLY

[75] Inventor: Thomas J. Gretz, Clarks Summit, Pa.

[73] Assignee: Arunction Industries, Inc., Seranton, Pa.

[21] Appl. No.: 09/473,434

[22] Filed: Dec. 29, 1999

[51] Int. Cl.$^7$ ...................................................... H02G 3/18
[52] U.S. Cl. .................. 174/65 R; 174/65 G; 174/65 SS; 174/135; 174/152 G; 174/153 G; 16/2.1; 16/2.2; 248/56; 285/158; 439/460
[58] Field of Search .................... 174/64, 65 R, 174/65 G, 65 SS, 151, 135, 152 G, 153 G, 167; 248/56; 16/2.1, 2.2; 285/158, 161, 921; 439/460

[56] References Cited

U.S. PATENT DOCUMENTS

| 2,657,251 | 10/1953 | Bergan . |
| 3,300,163 | 1/1967 | Randolph . |
| 3,321,219 | 5/1967 | Sebo . |
| 4,525,000 | 6/1985 | Bachle . |
| 4,652,018 | 3/1987 | Boghosian . |
| 4,814,547 | 3/1989 | Riley et al. . |
| 5,208,427 | 5/1993 | Couto et al. . |
| 5,422,437 | 6/1995 | Schnell . |
| 5,456,614 | 10/1995 | Szegda . |
| 6,034,326 | 3/2000 | Jorgensen ............................. 174/65 R |

Primary Examiner—Dean A. Reichard
Assistant Examiner—Dhiru Patel

[57] ABSTRACT

An improved snap-in connector incorporating a liner or insert for the outbound end of the snap-in connector that comprises a generally cylindrical body having an outer periphery and inbound and outbound ends is described. The insert includes at least two, preferably three and most preferably four tabs that extend outwardly from the outer periphery of the inbound end and engage cast-in recesses in the inner periphery the outbound end of the snap-in connector. Also extending outwardly from the outer periphery of the liner or insert at points between the inbound and outbound ends of the liner or insert, and radially offset from the first set of tabs, is a second set of tabs, and preferably four in number that engage the outermost outbound end surface of the snap-in connector. Each of the tabs of the second set of tabs has an inbound surface that faces and lies parallel to the first set of tabs and an outbound surface that faces away from the first set of tabs and is angled so as to facilitate insertion of the liner into the outbound end of the snap-in connector from inside of the snap-in connector. The location of the second set of tabs is such that the distance between the first set of tabs and the second set of tabs is approximately the same as the distance between the recesses in the inner periphery of the outbound end of the snap-in connector that engage the first set of tabs and the surface of the outbound end of the snap-in connector that engages the second set of tabs.

5 Claims, 3 Drawing Sheets

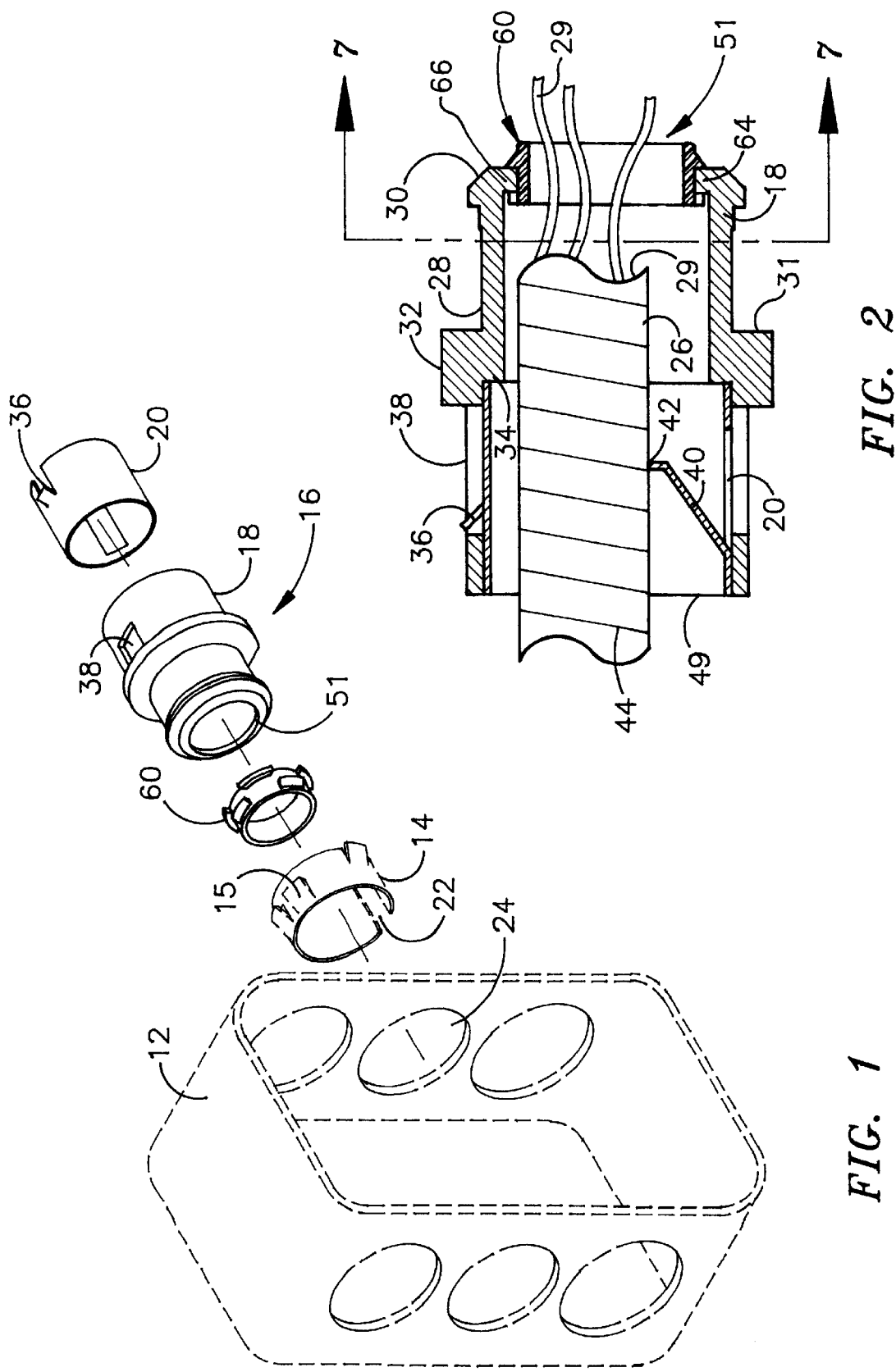

LINER ASSEMBLY

FIELD OF THE INVENTION

The present invention relates to insulating liners for snap-in cable terminations that provide a connector for helically wound or metal clad cable attached to a junction or other electrical box.

BACKGROUND OF THE INVENTION

International Publication Number WO 99/37005 in the name of Thomas J. Gretz for, "Snap in Cable Connector" describes a locking cable connector composed of three mating pieces that snap together and provide a connector for helically wound armored or metal clad electrical conductors. A spring steel adapter is used in conjunction with an electrical junction box to fix the location of the locking cable connector with respect to the junction box. The first piece of the snap in locking cable connector is a die cast member including at its inbound end a smooth outer cylindrical section having an outer diameter with flanges that accommodates a spring steel adapter. The second piece is a spring steel locking ring provided to receive a helically wound shielded cable that is inserted into the out end of the die cast member. The locking ring has outwardly directed tangs that allow insertion into the die cast member but restrict withdrawal thereof from the die cast member. The locking ring also has oppositely or outwardly directed tangs to receive the armored cable and to restrict its movement in the opposite or withdrawal direction.

The spring steel locking ring has a cut out section that permits slight compression so that the locking ring may be easily inserted into the die cast member. Once inserted, the locking ring is able to expand to the full inner diameter of the die cast member to provide a tight and secure fit.

Such devices preferably further include at their outbound end, an annular insulating insert or liner within the outbound end of the connector. The liner or insert is preferably fabricated from an insulating material such as a polymer. The insert or liner serves to insulate an inserted cable from the die cast housing and to prevent wearing of the outer surface of an inserted cable in those cases where vibration may cause rubbing between the inserted cable and the inner surface of the outbound end of the die cast housing of the connector.

SUMMARY OF THE INVENTION

According to the present invention, there is provided an improved generally circular or annular liner or insert for the outbound end of snap-in connectors of the type described in above-mentioned International Publication Number WO 99/37005 which is incorporated herein by reference in its entirety, or any similarly configured connector. The liner or insert of the present invention comprises a generally cylindrical body having an outer periphery and inbound and outbound ends. Extending outwardly from the outer periphery of the inbound end are at least two, preferably three and most preferably four tabs that engage cast-in recesses in the inner periphery the outbound end of the snap-in connector. Also extending outwardly from the outer periphery of the liner or insert at points between the inbound and outbound ends of the liner or insert, and radially offset from the first set of tabs, is a second set of tabs, at least two, preferably three and most preferably four in number. All members of the second set of tabs lie parallel with one another about the outer periphery of the liner or insert. Each of the tabs of the second set of tabs has an inbound surface that faces and lies parallel to the first set of tabs and an outbound surface that faces away from the first set of tabs and is angled so as to facilitate insertion of the liner into the outbound end of the snap-in connector from inside of the snap-in connector. The location of the second set of tabs is such that the distance between the first set of tabs and the second set of tabs is approximately the same as the distance between the recesses in the inner periphery of the outbound end of the snap-in connector that engage the first set of tabs and the outbound end of the snap-in connector that engages by the second set of tabs.

DESCRIPTION OF THE DRAWINGS

FIG. 1 is an exploded view of the snap-in connector of the present invention.

FIG. 2 is a cross-sectional view of the cable connector of FIG. 1.

DETAILED DESCRIPTION

Figure 3:
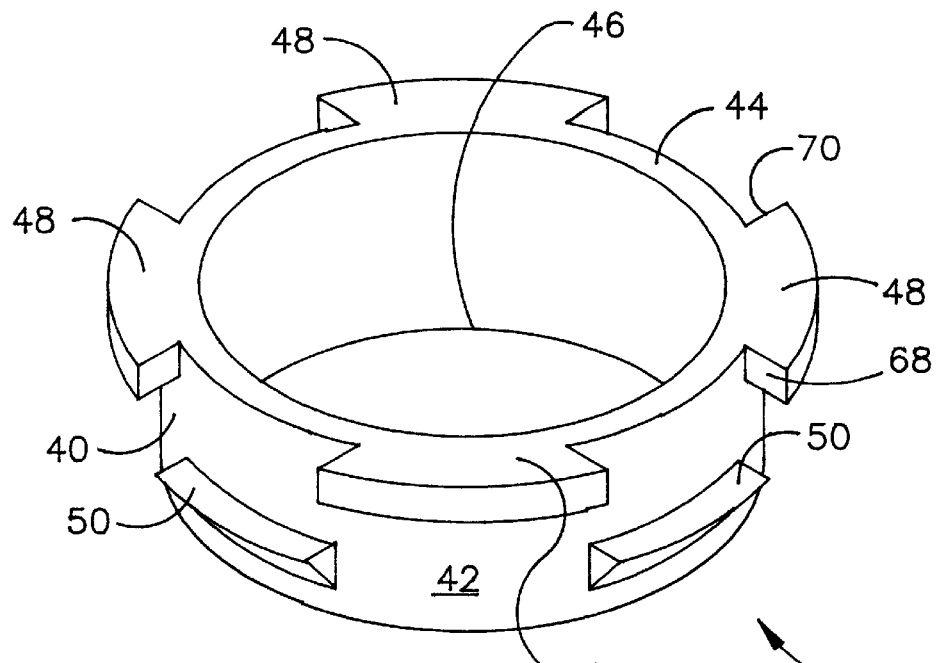
FIG. 3 is a plan view of the insert of the present invention.

The present invention provides an improved snap-in cable connector configured for use with helically wound cable that locks the cable into the junction box. The snap-in cable connector is designed to grip the helical grooves in the armored cable securely locking it into position with respect to the cable connector and in turn to the electrical junction box.

Referring now to the drawings, FIG. 1 depicts an exploded view of a junction box 12, a snap-in cable connector 16 with spring steel adapter 14, a die cast member 18, a spring steel locking ring 20 and an insert or liner 60. Spring steel adapter 14 includes slot 22 to permit expansion prior to being fitted over reduced diameter area 28. Adapter 14 fits into aperture 24 of junction box 12. Adapter 14 also includes a plurality of tangs 15 to prevent removal of adapter 14 once inserted into aperture 24. An insert or liner 21 is inserted into the outbound end of connector 16 to inhibit chafing due to relative movement between the wires of an inserted cable (not shown) and die cast member 18 and to provide insulation therebetween. More detailed descriptions of connector 16, and its various elements may be found in International Publication Number WO 99/37005, entitled, "Snap in Cable Connector", and U.S. Pat. No. 5,373,106, entitled "Quick Connect Fitting for Electrical Junction Box", both assigned to the same assignee as the present invention and both incorporated herein by reference in their entirety.

FIG. 2 is a cross-sectional view of cable connector 16 illustrating the interconnection of die cast member 18 and spring steel locking ring 20, the locking function of spring steel locking ring 20 around armored cable 26 and the inserted location of insert or grommet 21 of the present invention.

Die cast member 18 is illustrated as having a reduced diameter area 28 for receiving adapter 14. A lip 30 prevents adapter 14 from slipping out once inserted. Lip 30 has a slight incline to permit insertion into aperture 24 of junction box 12. On the other side of area 28 is a perpendicular face 31 as art of an enlarged section 32. The diameter of face 31 is greater than the diameter of lip 30 to prevent over insertion into aperture 24. Die cast member 18 with adapter 14 can be inserted into aperture 24 only up to the face 31 of section 32. The inner diameter of die cast member 18 reduces on the inside of section 32 to form a face or shoulder 34 to restrict insertion of steel locking 20. Thus, the inside diameter of locking ring 20 is approximately the same as the inside diameter of shoulder 34.

Steel locking ring 20 is shown as inserted into die cast member 18 with a first tang 36 in a corresponding opening 38 in die cast member 18. As is seen, spring steel tang 36 has an outward extending angle which permits the tang to be depressed inwardly as steel locking ring 20 is inserted into inbound end aperture 49 of member 18, yet spring outwardly into openings 38 and 38A to prevent withdrawal. Also illustrated is cable tang 40 in steel locking ring 20, gripping the bottom of the helical recesses of armored cable 26 at point 42 in helical groove 44. Shoulder 34 of die cast member 18 is positioned such that the end of tang 36 barely clears the edge of opening 38 before steel locking ring 20 reaches a place where it cannot be inserted further.

As is seen in FIG. 2, armored cable 26 is cut at the end 27 of the connector that is just inside the inner end. The wires 29 are connected on the inside of the junction box. Also shown in FIG. 2 is plastic grommet, insert or liner 60 that forms the principle element of the current invention.

FIG. 3 depicts a perspective view of liner 60 of the present invention. Liner 60 comprises a cylindrical body 40 having an outer periphery 42, an inbound end 44, an outbound end 46, a first set of tabs 48 and a second set of tabs 50.

Figure 6:
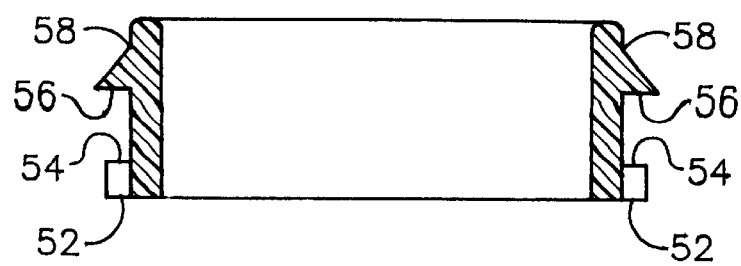
FIG. 6 is a side view of the insert of the present invention.
Figure 4:
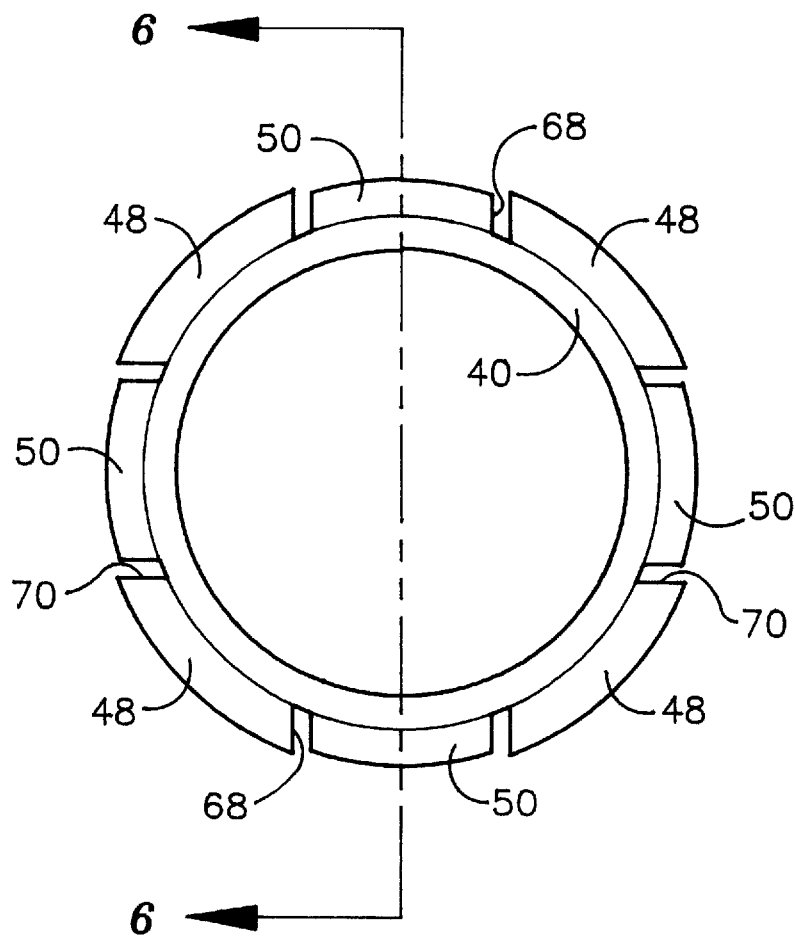
FIG. 4 is an outbound end view of the insert of the present invention.

As shown most clearly in FIGS. 4 and 6, tabs 48 and 50 are offset, i.e. tabs 48 lie between tabs 50 and vice versa. Tabs 48 extend radially from inbound end 44 while tabs 50 extend radially from outer periphery 42 at a point intermediate inbound end 44 and outbound end 46. The distance between tabs 48 and 50 along outer periphery 42 is determined by the dimensions of outbound end 51 of connector 16 as shown most clearly in FIG. 2 and described more fully below. While tabs 48 are depicted in the drawings as preferably being four in number spaced at 90°, it will be obvious to the skilled artisan, that three such tabs 48 spaced at 120° or two such tabs spaced at 180° could serve equally well. In point of fact, a single annular tab could be substituted for the plurality of tabs 48 depicted in the drawings; however, this configuration would require the use of more material and is not preferred.

Similarly, while a set of four tabs 50 is depicted in the drawings and this configuration is clearly preferred, sets of three or two tabs 50 appropriately angularly displaced or even a single annular tab 50 could be used.

Figure 5:
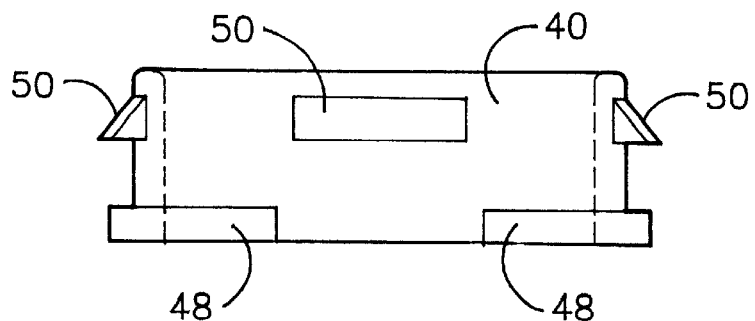
FIG. 5 is a cross-sectional view along the line A—A of FIG. 4.

As best shown in FIGS. 3, 5, and 6 tabs 48 have a generally rectangular cross section, i.e., their opposing faces 52 and 54 are generally parallel. Tabs 50 on the other hand define two distinctly different opposing faces 56 and 58. Surfaces 56 are generally parallel to surfaces 52 and 54 of tabs 48 while surfaces 58 are angled outwardly from outer periphery 42 so as to provide a guiding surface that will slide through aperture 49 into aperture 51 thereby permitting engagement of surfaces 56 with periphery 66 of outbound aperture 51.

Figure 7:
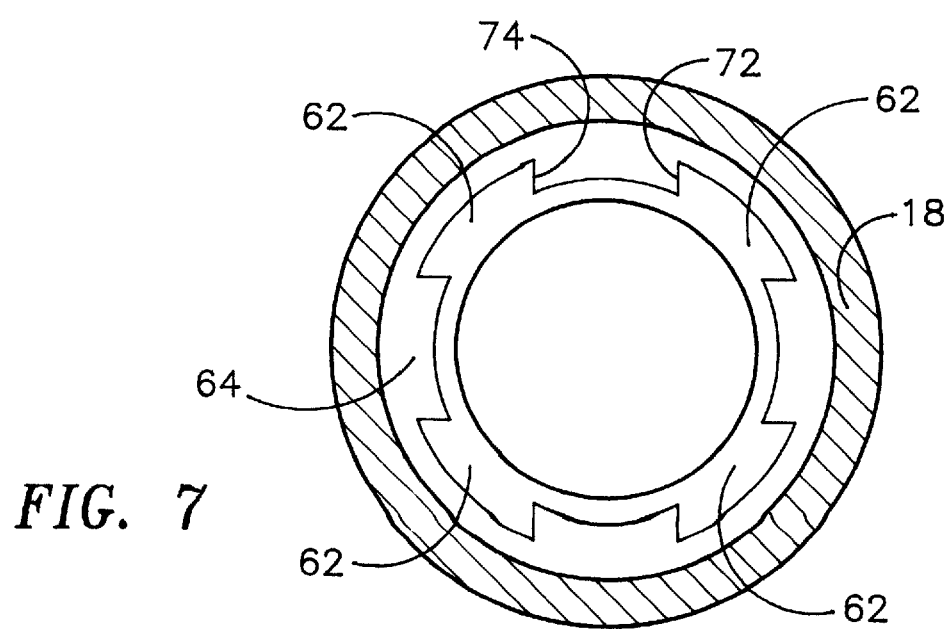
FIG. 7 is a sectional view along the line B—B of FIG. 2.

As best seen in FIG. 7, die cast member 18 has recesses 62 cast into lip 64 that forms periphery 66 of outbound end 51. Recesses 62 are sized to receive and retain tabs 48 upon insertion of insert 60 into outbound aperture 51 from the inside of die cast member 18, while tabs 50 engage outer surface 66 of lip 64 preventing withdrawal of insert 60 into die cast member 18.

The longitudinal spacing between tabs 48 and 50 along the depth of cylinder 40 must, of course, approximate the thickness of lip 64 to ensure proper and secure engagement of insert 60 with die cast member 18 upon insertion of insert 60 into outbound aperture 51. The depth of recesses 62 should approximate the depth of tabs 48 to further ensure a proper engagement.

While the opposing extremities 68 and 70 of tabs 48 as shown in FIGS. 3 and 4, and the opposing extremities 72 and 74 of mating recesses 62 preferably angle outward or flare to provide a more secure engagement, they could be square or even angle inwardly so long as an adequate engagement between tabs 48 and recesses 62 is achieved.

While the insert of the present invention may be fabricated from any number of suitably manufacturable insulating materials, it is preferred that it be fabricated from nylon because of the temperature and wear resistance characteristics of this material.

There has thus been described an improved snap-in connector for attachment of armored cable to an electrical junction box, which connector incorporates an improved outbound end wire protective insert or grommet. The improved insert of the present invention requires significantly less material while providing the same level of insulation and chafing protection as previous designs thereby reducing the cost of the insert.

As the invention has been described, it will be apparent to those skilled in the art that the same may be varied in many ways without departing from the spirit and scope of the invention. Any and all such modifications are intended to be included within the scope of the appended claims.

What is claimed is:

1. In a snap-in locking helical armored cable connector configured for use with a spring steel adapter to join an electrical junction box to fix a location of the locking cable connector with respect to the junction box comprising:

A) a first piece including a die cast member with an opening having inbound and outbound ends, a smooth inboard cylindrical section having a diameter to include and accommodate a spring steel adapter and a lip having an inbound and an outbound surface at the outbound end, said lip being of a smaller diameter than said cylindrical section; and B) a locking ring to receive an armored cable and lock said cable into said die cast member, said locking ring having a tang allowing insertion into said die cast member but restricting withdrawal motion from said die cast member and having a cable gripping tang oppositely directed to receive the armored cable and restrict its movement in a reverse direction, the improvement comprising the incorporation of an insert in the outbound end of said snap-in connector, said insert comprising:

1) a cylindrical body having inbound and outbound ends and an outer periphery;

2) a first plurality of tabs extending outwardly from the periphery at the inbound end of said insert that engage similarly shaped recesses cast into the inbound surface of said lip when said insert is inserted into said die cast member through the inbound end; and 3) a second plurality of tabs extending outwardly from the outer periphery of the cylindrical body at a point intermediate the inbound and outbound ends of the insert, radially offset from said first plurality of tabs and that engage the outbound surface of said lip when said insert is inserted through the inbound end of said die cast member.

2. The snap-in connector of claim 1 wherein each of said first plurality of tabs has an inbound and an outbound surface, and said inbound and outbound surfaces are parallel and each of said second plurality of tabs has an inbound and an outbound surface, said outbound surface of each of said second plurality of tabs is angled away from said outer periphery to allow for ease of insertion of said insert into said die cast member and said inbound surface of each of said second plurality of tabs lies parallel to said inbound and outbound surfaces of said first plurality of tabs.

3. The snap-in connector of claim 2 wherein each of said first plurality of tabs has a pair of opposing ends and said opposing ends are flared, and said recesses are similarly flared.

4. The snap-in connector of claim 2 wherein said first and second pluralities of tabs each comprise four tabs evenly spaced about the outer periphery of the insert.

5. The snap-in connector of claim 4 wherein said insert is fabricated from nylon.

* * * * *